United States Patent
Lippa

(10) Patent No.: US 7,059,313 B2
(45) Date of Patent: Jun. 13, 2006

(54) SOFTWARE FUEL VOLATILITY MEASUREMENT

(75) Inventor: Allan J. Lippa, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/044,790

(22) Filed: Jan. 26, 2005

(65) Prior Publication Data

US 2005/0133013 A1  Jun. 23, 2005

Related U.S. Application Data

(63) Continuation-in-part of application No. 10/065,362, filed on Oct. 9, 2002, now Pat. No. 6,935,311.

(51) Int. Cl.
*F02D 41/00* (2006.01)
*B60T 7/12* (2006.01)

(52) U.S. Cl. .................. 123/685; 123/698; 123/518; 73/118.1

(58) Field of Classification Search ............. 123/518, 123/519, 520; 701/103, 107; 73/118.1, 73/118.2, 119 A
See application file for complete search history.

(56) References Cited

U.S. PATENT DOCUMENTS

| | | | | |
|---|---|---|---|---|
| 5,184,591 A | * | 2/1993 | Sausner et al. | 123/520 |
| 6,196,203 B1 | * | 3/2001 | Grieve et al. | 123/520 |
| 6,631,634 B1 | * | 10/2003 | Cook et al. | 73/118.1 |
| 2005/0005682 A1 | * | 1/2005 | Teutsch et al. | 73/49.2 |

FOREIGN PATENT DOCUMENTS

| | | |
|---|---|---|
| DE | 35 23 230 C2 | 1/1986 |
| DE | 39 07 850 A1 | 9/1989 |
| DE | 38 37 901 A1 | 5/1990 |
| DE | 196 22 848 A1 | 12/1996 |
| DE | 197 29 869 C2 | 2/1998 |

* cited by examiner

*Primary Examiner*—Hai Huynh
(74) *Attorney, Agent, or Firm*—Allan J. Lippa; Alleman Hall McCoy Russell & Tuttle LLP

(57) ABSTRACT

A system is described using a fuel quality sensor or an estimate of fuel volatility for controlling various aspects of engine operation. For example, improved fuel tank leak detection may be achieved using an estimate of fuel volatility obtained from fuel purging operation.

14 Claims, 12 Drawing Sheets

SOFTWARE FUEL VOLATILITY MEASUREMENT

The present application is a continuation-in-part of U.S. patent application Ser. No. 10/065,362, filed Oct. 9, 2002 now U.S. Pat. No. 6,935,311, the entire contents of each of which are incorporated herein

BACKGROUND AND SUMMARY

Determination of fuel volatility may be useful for various aspects of engine control and diagnostics. While sensors may be used, the inventor herein has recognized an advantageous approach for estimating fuel volatility in place of, or in addition to, other detection techniques.

In one example, it is possible to determine the fuel volatility and/or combustion characteristics based a rate of change of vapor generation during fuel vapor purging operation. In one example embodiment, the rate of change of vapor generation, (which may be normalized based on mass air flow, manifold pressure, or other parameters to reduce the effect of variable flown a sensor) can be used to enable diagnostic fuel tank operation after the engine is stopped. In this way, it can be possible to reduce errors in degradation detection. For example, in the case where a sealed fuel tank is checked for leaks based on environmental temperature changes, changes in pressure due to high fuel volatility that may mask such leaks can be identified. Furthermore, a improved measurement or estimate of fuel volatility can be used for other engine control purposes as well.

DETAILED DESCRIPTION

Figure 1:
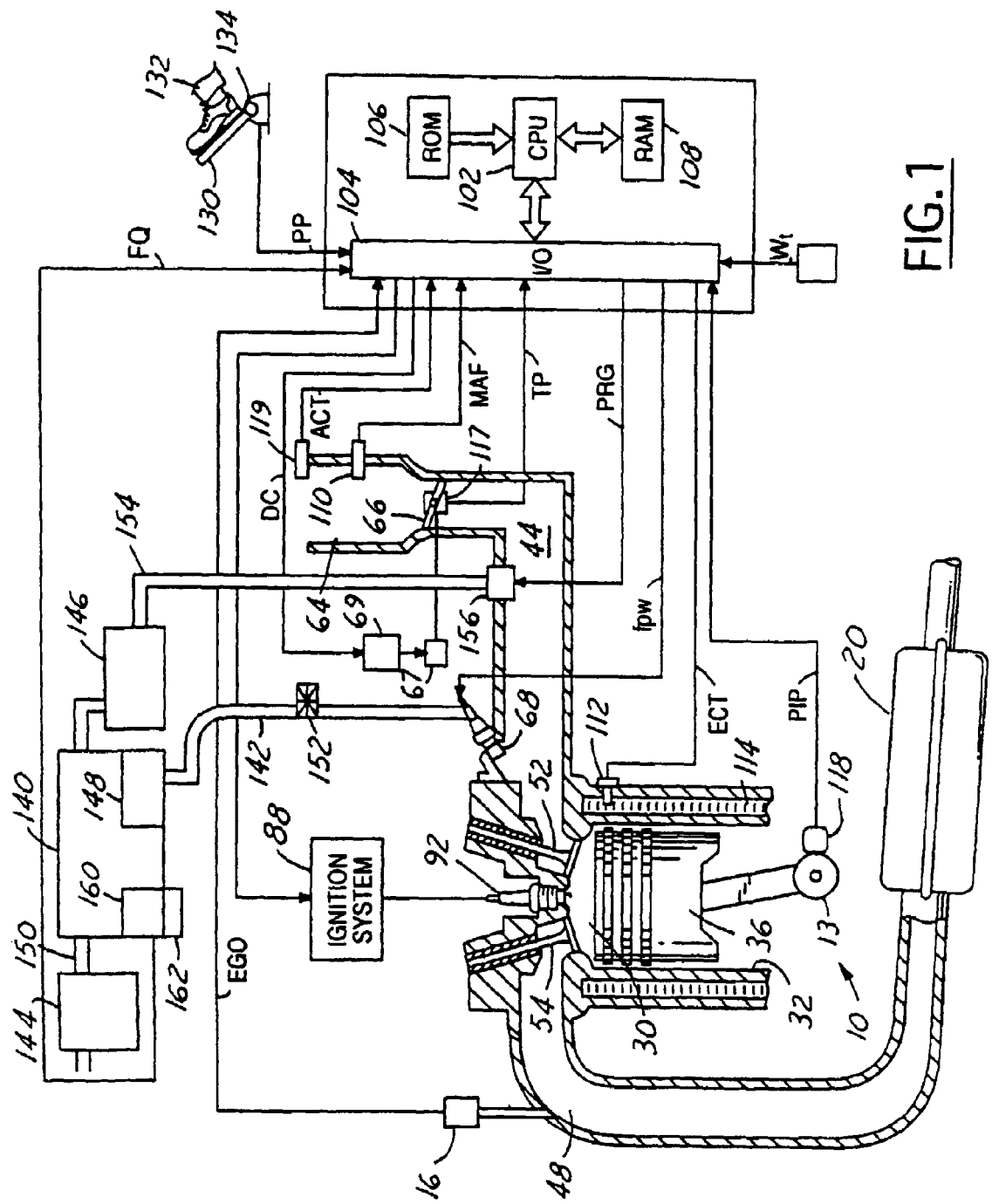
FIG. 1 is a block diagram of an embodiment used to advantage.

Internal combustion engine 10 comprises a plurality of cylinders, one cylinder of which is shown in FIG. 2. Electronic engine controller 12 controls Engine 10. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of turbine speed (Wt) from turbine speed sensor 119, where turbine speed measures the speed of shaft 17; and a profile ignition pickup signal (PIP) from Hall effect sensor 118 coupled to crankshaft 13 indicating and engine speed (N).

Continuing with FIG. 1, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

Continuing with FIG. 1, a fuel tank 140 is shown for containing fuel used to operate engine 10. Pump 148 is shown inside the fuel tank 140 for pressurizing liquid fuel in fuel line 142. Fuel line 142 delivers pressurized liquid fuel to fuel injector 68 which, as described above herein, is controlled by a signal (fpw) received from controller 12. Fuel pressure regulator 152 is also shown for regulating pressure in fuel line 142. Regulator 152 is a mechanical pressure regulator valve.

A fuel vapor management system is also shown in FIG. 1 coupled to fuel tank 140 and engine 10. In particular, fuel vapor line 154 couples the fuel tank to the intake manifold 44. A purge control valve 156 is also shown receiving a signal from controller 12. As described below herein, controller 12 adjusts purge valve 156 to control air and fuel vapor entering manifold from the fuel system based on engine operating conditions. Continuing with the fuel vapor system, the fuel tank is shown coupled to a first and second carbon canister 144 and 146. Fuel vapors entering the engine 10, from fuel tank 140 first pass through the first fuel vapor carbon canister 146. Carbon canister 146 absorbs fuel vapors and desorbs fuel vapors depending on vapor concentration. The second carbon canister 144 is coupled downstream of the fuel tank via line 150. A solenoid valve may optionally be included in or coupled to canisters 144 and 146, if desired, to block flow through the respective canisters.

The first and second carbon canister may optionally be replaced with a parallel configuration canister, such as third canister 147 with valve 149. Alternatively, all three canisters may be used, or only one or two of the three canisters may be used.

Finally, fuel quality sensor 160 is shown in fuel tank 140. In this particular embodiment, sensor 160 is in fluid contact with liquid fuel stored in fuel tank 140. Sensor 160 provides a signal (FQ) to controller 12. As described below and with particular reference to FIG. 2, sensor 160 is a surface acoustic wave device operating at approximately 100 megahertz. In general terms, this sensor provides a signal related to viscosity and density of the liquid fuel stored in tank 140.

According to the present disclosure, fuel quality sensor 160 can be located in various different positions on the fuel system/engine system. As an example, fuel sensor 160 can also be coupled to fuel line 142. The sensor can be located either upstream or downstream of pressure regulator 152. Sensor location depends upon various factors, such as, for example, measuring the fuel near the point of fuel delivery, measuring fuel with minimal changes in fuel temperature, and various others.

In addition, a dielectric sensor 162 is shown for measuring liquid fuel in tank 140. The dielectric sensor output is typically utilized to detect the ethanol content of gasoline fuels. Further, intake air temperature sensor 119 is shown coupled to intake manifold 44 for measuring a temperature of the intake air and providing a signal (ACT) to controller 12.

Referring now to FIG. 2, details of sensor 160 are described. Sensor 160 is a surface acoustic wave device, operating at approximately 100 megahertz. The acoustic wave generated by the device interacts with the liquid fuel in which is contacting the device. The more viscous the liquid fuel, the more the propagation speed is changed and the more the acoustic wave is attenuated. By placing an electronic amplifier between input and output of the surface acoustic wave delay line, an oscillator is obtained. The oscillation frequency and electronic gain needed for oscillation on both measures for the viscosity (related to propagation, velocity and attenuation, respectively).

In addition, the surface acoustic wave device is covered by a thin layer of silicon dioxide. The wet cell (with liquid fuel) is placed on top of the delay lines, thereby allowing a leak-free connection secured with a 14 millimeter viton o-ring. The sensor output, (a frequency signal in megahertz in this particular example) provides an indication of dynamic viscosity times density.

According to the present disclosure, this signal (related to dynamic viscosity times density) correlates to fuel quality of liquid fuel contained in the fuel system coupled to the engine. In other words, the sensor output can be correlated to the "drivability index (DI)" typically utilized to characterize fuel quality for engine combustion. Various forms of the sensor output can be used, as described below, including frequency, phase, amplitude, or propagation velocity.

Sensor 160, in one embodiment, can be based on a micro-acoustic (LOVE) waves the property through a thin wave guide material deposited on a piezoelectric substrate. One example of the device is described in "Viscosity Sensing Using LOVE wave devices" by B. Jakoby and M. J. Vellekoop in Vol. A68 of Sensors and Actuators (1998) pgs 275–281. When the sensor is in contact with liquid fuel, the propagation losses and the phase velocity of the LOVE wave change as a function of the viscosity-density product of the fuel. The sensor size is typically approximately 8×4 millimeters. Since viscosity is dependent on temperature, the sensor measures and corrects for this temperature. Alternatively, a separate temperature sensor can be used and the correction performed in controller 12. In other words, the device can be temperature compensated by measuring the temperature and compensating for this measurement. Alternatively, or in addition, a dual delay line can be used, where only one is exposed to the liquid and the other not, but both are exposed to the same temperature. Besides the device temperature dependence, there is also temperature dependence in the viscosity-density of the liquid. Here, the temperature can be measured and the measurement can be compensated as described above. Alternatively, or in addition, the device can be heated to a constant temperature and the liquid probed by the device is heated to that same temperature. If measurements are always performed at the same temperature, no further compensation would be used.

The sensor 160 can have various outputs including a shift in oscillation frequency, or a change in acoustic attenuation as measured by the electronic gain required for the oscillation.

As indicated, various types of acoustic waves can be generated on or in a piezoelectric material. This acoustic wave propagating in or on the substrate then interacts with a liquid adjacent to the substrate to "probe" the properties of that liquid. These include, but are not limited to: thickness shear mode resonator, flexural plate wave device, acoustic plate mode device, and Love wave sensors. The LOVE wave sensor is a described in detail since it has a simple and rugged design.

Figure 2A:
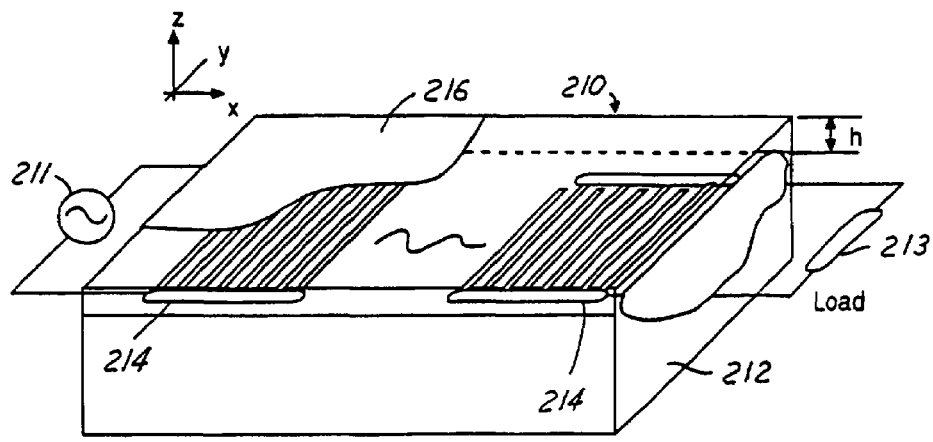
FIGS. 2A–C are schematic diagrams of an example acoustic wave fuel quality sensor.
Figure 2B:
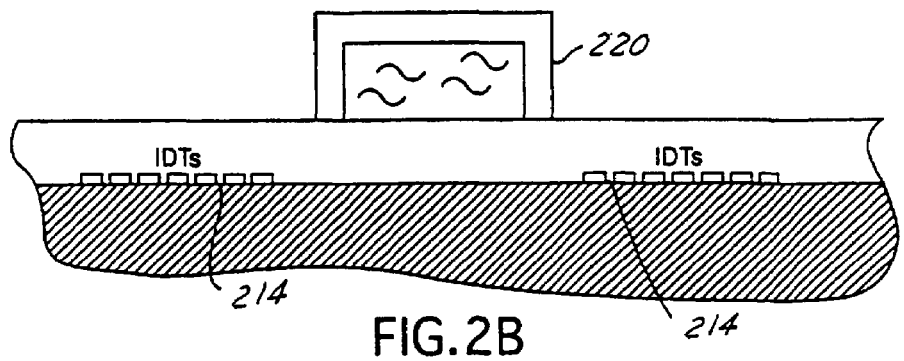
Figure 2C:
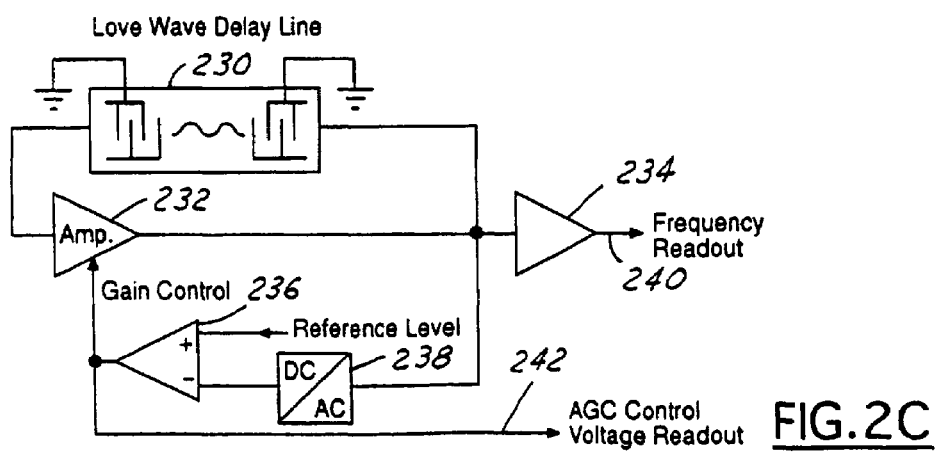

Referring now to FIGS. 2A through 2C, and specifically to FIG. 2A, a schematic diagram of a viscosity sensing LOVE-wave device is shown. In this example of sensor 160, an isotropic guiding layer of silicon dioxide (210) is deposited on a substrate 212. Piezoelectric ST quartz is the substrate material 212, where the propagation direction is chosen to be orthogonal to the crystal X direction. Interdigital transducers ($IDT_s$) 214 enable electrical excitation and reception of the LOVE-wave. The interdigital transducers 214 are embedded at the interface between the layer 210 and the substrate 212. The IDTs convert an electric signal into an acoustic wave.

As described above, the propagation direction is chosen to be orthogonal to the crystalline X direction. This orientation allows the excitation of sheer polarized modes by the interdigital transducers 214. The guiding layer 210 is deposited on the substrate by using plasma enhanced chemical vapor deposition. The acoustic energy associated with the propagating wave becomes concentrated in layer 210. This allows increased sensitivity with respect to surface mass loading. The top surface of layer 210 is in contact with the liquid fuel contained in tank 140, in one example. Additionally, shielding 216 can be placed over guiding layer 210. In one example shielding 216 is a metal layer. The delay line is used as a frequency determining element and an oscillator circuit. In other words, it changed in the delay time due to the sensing from the transducers can be observed by monitoring oscillation frequency as described below herein.

In addition, FIG. 2A shows a source 211 coupled to one of the transducers 214 and a load 213 coupled to the other of the transducers 214.

In general, the change in frequency as the viscosity-density of the liquid changes can be the sensor output. This change in frequency is related to the change in the propagation velocity of the acoustic wave. Alternatively, the change in damping of the acoustic wave can also be measured by the amount of electronic amplification that is needed to keep the device oscillating.

Referring now to FIG. 2B, a side view of the sensor 160 is illustrated using schematic diagrams. In particular, a wet cell 220 is shown mounted on the device, which allows the liquid fuel to contact only the region between the interdigital transducers 214. Wet cell 220 can be attached using adhesive and sealing materials such as silicon rubber. An alternate approach would utilize a micro machined wet cell attached using fusion bonding techniques.

Next, FIG. 2C shows the device coupled to analog circuitry to generate the sensor output. In FIG. 2C, the circuitry allows the determination of the affects of viscosity on the phase shift via measuring a corresponding change in frequency. Further, the control voltage of the automatic GAIN control is monitored for a constant output level. In particular, FIG. 2C shows the output delay line 230 from the interdigital transducers 214 coupled to a first amplifier 232. Further, a GAIN control amplifier 236 is used with a fixed reference level voltage. Further, the oscillator output is also fed to a DC/AC converter 238 and then to amplifier 236. The output of amplifier 236 is fed to amplifier 232. Further, the output of the GAIN control 242 provides the automatic GAIN control voltage readout which can be monitored. Further, the oscillator output is first buffered via amplifier 234 and then provides frequency readout 240 which can be used to determine fuel viscosity times density. The relation between the frequency change ($\Delta F/F$) and the relative change in the wave number ($\Delta \beta / \beta$) is given by the following equation:

$$\Delta F/F = -V_g/V_P \times \Delta B/B$$

Where $V_g$ and $V_P$ denote the group and phase velocity of the LOVE wave.

Delta B/B is the relative wave number change evaluated at constant frequency. Complete details of calibration and calculations using the sensor in FIGS. 2A through 2C can be determined from the reference titled "Viscosity Sensing Using a LOVE-wave Device" by Bernard Jakoby and Michael J. Vellekoop, Vol A68 of Journal Sensors and Actuators (1998) pages 275–281.

As described above, the details shown in FIGS. 2A to 2C show one example embodiment where acoustic energy (waves) are utilized to obtain information about the gasoline fuel fed to the engine. However, the present inventors have contemplated various other embodiments. For example, as described below here with particular reference to FIGS. 11–14, and 17, one could also estimate fuel quality, or volatility, or viscosity, using estimates based on other sensors in the engine/vehicle system. Further, different sensor types could be used where different energy types are introduced into the fuel, such as light energy.

Figure 3:
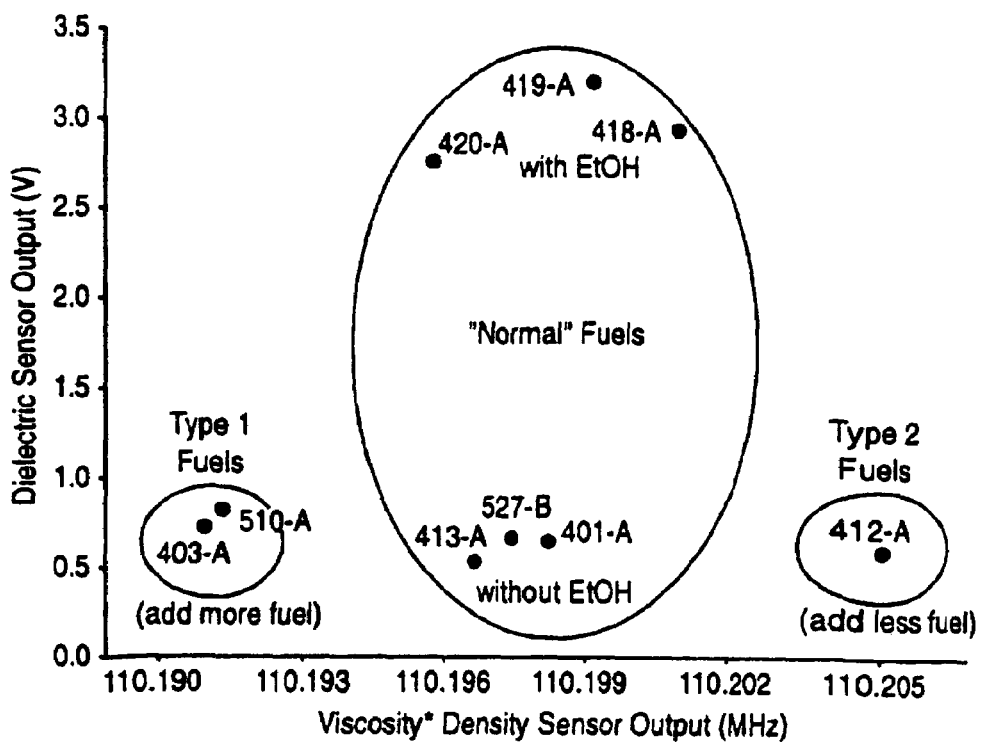
FIGS. 3–4 are graphs illustrating sensor output for use with the present disclosure.

Referring now to FIG. 3, the graph shows output of sensor 160 versus output of sensor 162 for various different fuels. The first grouping labeled "normal" fuels illustrates variation and sensor output across fuels that typically result in normal engine cold starts. The graph illustrates the different fuels both with and without ethanol. The graph also illustrates type 1 fuels on the lower left hand side indicating a low sensor output from sensors 160 and 162. These fuels are sometimes known as "hesitation" fuels in that they result in a lean combustion during engine cold starting compared with the normal fuels. Finally, FIG. 3 illustrates a type 2 fuel which typically results in a rich combustion compared to the normal fuels. For these type 2 fuels, sensor 160 provides an increased sensor output. As illustrated in FIG. 3, in one embodiment when controller 12 receives a signal (FQ) from sensor 160 during an engine start, the controller adjusts the amount of fuel delivered via injector 68 based on the output of sensor 160. When the sensor 160 provides an output indicative of a normal fuel, controller 12 simply provides the scheduled amount of fuel via injector 68 during the engine start. However, if sensor 160 provides an output greater than approximately 110.202 megahertz, the routine reduces the amount of scheduled fuel to be delivered via injector 68 thereby preventing an overly rich mixture. Similarly, when sensor 160 provides an output lower than approximately 110.913 megahertz, controller 12 adds additional fuel during the cold start to be delivered by injector 68, thereby preventing the combustion from being too lean. In this way, more consistent engine cold starting can be achieved even when large variations in the fuel are experienced. This method, along with alternative embodiments, is described more fully with regard to the routines described below.

Figure 4:
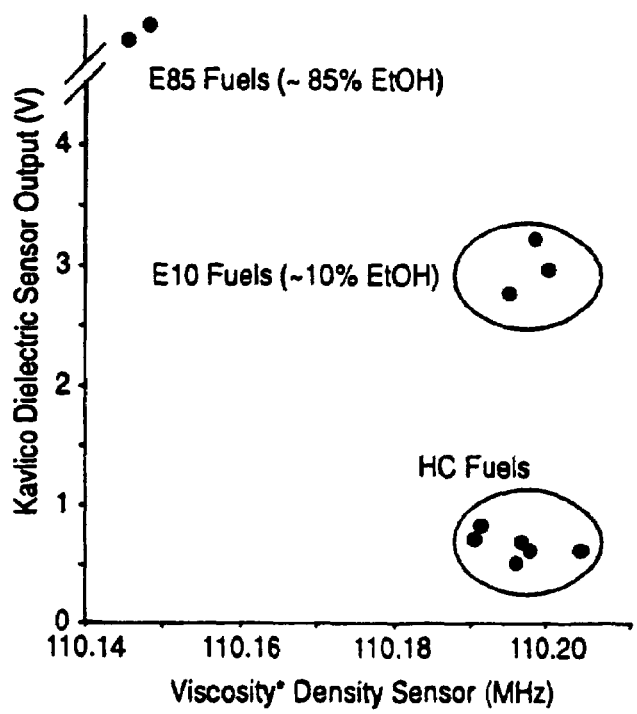

Referring now to FIG. 4, the graph illustrates sensor output of sensors 160 and 162 with different levels of ethanol. In particular, the graph illustrates that sensor 160 provides a high sensor output for hydrocarbon and fuels containing approximately 10% ethanol. However, for methanol fuels (approximately 85% ethanol) sensor 160 provides a relatively low sensor output. In this way, sensor 160 can be used to detect the type of fuel in vehicle. In particular, according to the present disclosure, controller 12 can determine whether the vehicle is operating with methanol based on sensor 160.

As described above, output from sensor 160 can be utilized as an indication of the drivability index (DI). The drivability index is typically determined based on the following equation:

$$DI = 1.5 \times T_{10} + 3 \times T_{50} + T_{90}$$

Where $T_x$ is based on the ASTMD-86 distillation curve.

When oxygenates are present in the fuel the correction to the DI is as follows:

$$DI = 1.5 \times T_{10} + 3 \times T_{50} + T_{90} + 20 \ast (\text{weight } \%O2) \ ^\circ F.$$

Typically, a high DI is indicative of a poor drivability fuel (poor cold-start), resulting in combustion too lean of stoichiometry. Conversely, a low DI can indicate poor driveability in that the combustion is too rich of stoichiometry.

This Driveability Index (DI) in one method to characterize fuel quality. DI correlates well with the cold-start driveability.

Figure 5:
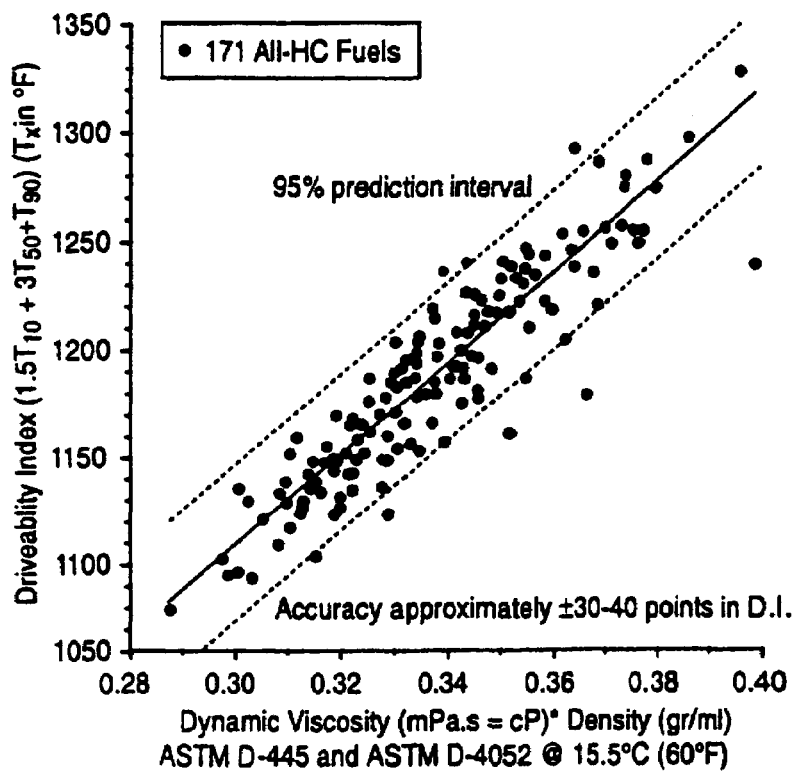
FIGS. 5–6 show experimental data illustrating the relationship between viscosity, density, and DI.
Figure 6:
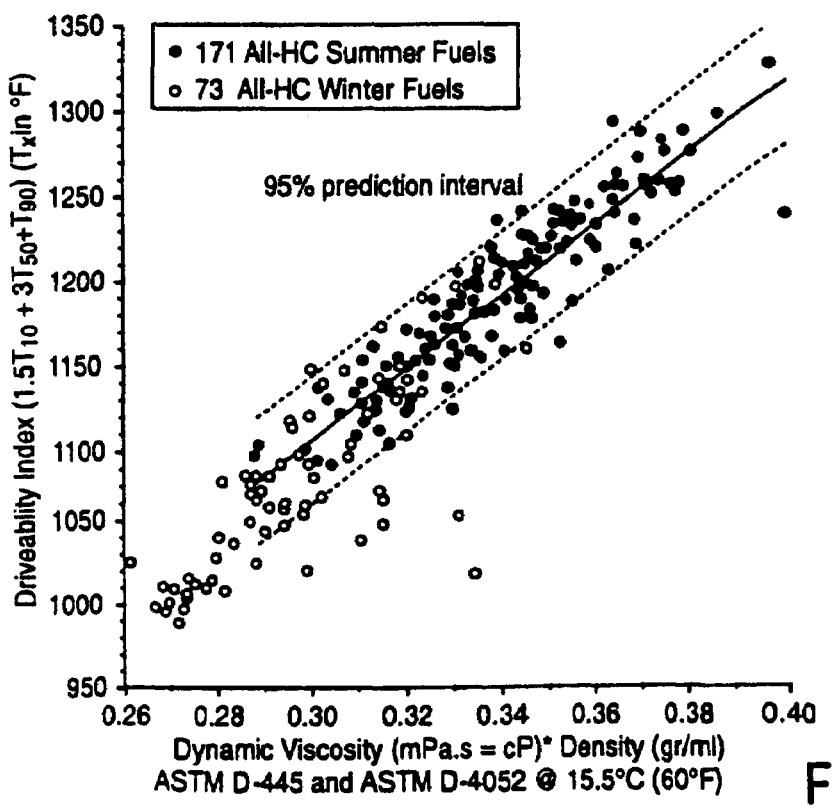

FIGS. 5 and 6 illustrate DI data versus dynamic viscosity times density for various hydrocarbon fuels contained in the American Automobile Manufacturer's Association 1996 survey data. Also note that a correction for ethanol fuels and methanol fuels can be used. Typically, a 10% EtOH results in a correction of approximately 70 points in DI. Further, a 10% MTBE typically results in a correction of approximately 35 points in the drivability index.

As shown in FIGS. 5 and 6, a relatively consistent correlation between the drivability index and the dynamic viscosity times density measurement is obtained. As shown in FIG. 6, this correlation is also true including both summer and winter hydrocarbon fuels.

The following is a potential explanation of why such measurements correlate to drivability index and, thereby, to combustion quality. Drivability can be affected by the degree of fuel atomization during the combustion process. The more effective the fuel atomization is, the smaller the mean fuel drop in size can be and the higher the rate of evaporation and mixing with the combustion air can be. For a fixed geometry of the fuel injector and a constant fuel pressure and air flow and density, the atomization is influenced by properties of the liquid fuel such as, for example: fuel density, fuel viscosity and surface tension. In addition to atomization, the spray angle can also be influenced by the density and viscosity of the fuel. Thus, measuring fuel viscosity and density can give an indication of the fuel quality.

Figure 7:
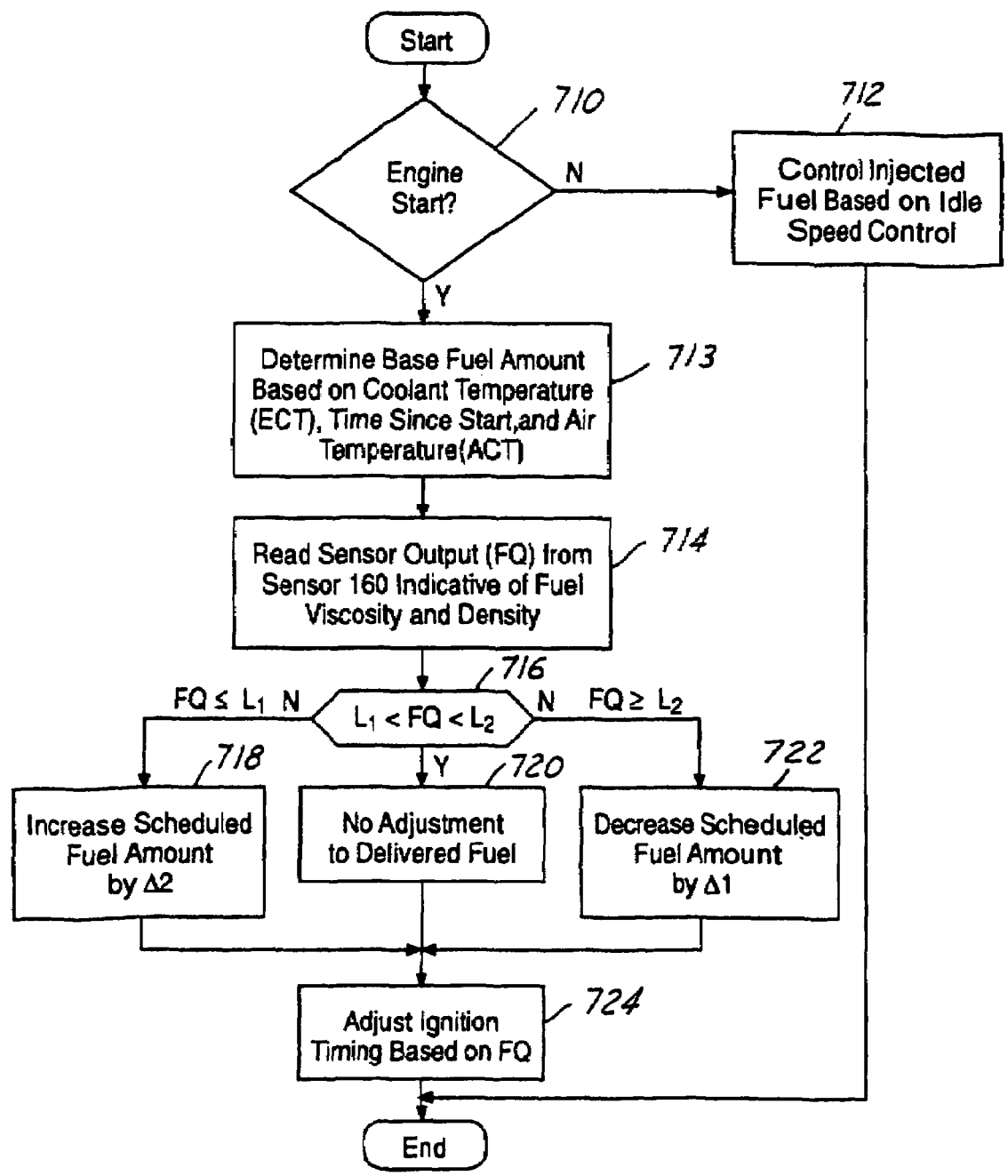
FIGS. 7–14 are high-level flow charts of various operations.

Referring now to FIG. 7, the routine is described for controlling fuel injection during an engine start based on the fuel quality sensor. First, in step 710, the routine determines whether the engine is currently starting. In particular, in step 710, the routine determines whether the engine is in either the crank mode, or the initial run-up mode where engine speed increases rapidly to the desired idle rpm speed. When the answer to step 710 is "no", the routine continues to step 712 where injected fuel is controlled based on the desired idle speed and measured idle speed.

When the answer to step 710 is "yes", the routine continues to step 712 to determine a base fuel amount (fuelb) based on the engine coolant temperature (ect), times since engine start, and intake air temperature (act). This base fuel amount is stored in lookup tables and calibrated over various engine conditions to achieve a reliable engine start. However, variations in fuel quality can cause degraded engine starts using this base fuel amount. In particular, variations in the fuel type can cause engine combustion to be either too lean or too rich, thereby creating poor engine startability and degraded drivability.

Note that the base amount of fuel can also be determined based on a desired torque. The desired torque can be determined from the operator of the vehicle, or from a controller. Further, the desired torque can be based on the pedal position.

Continuing with FIG. 7, in step 714, the routine reads the sensor output (FQ) from sensor 160, which is indicative of fuel viscosity and density. Note, that in an alternate embodiment, the routine can simply measure either fuel viscosity or fuel density individually, or can simply measure fuel viscosity alone to provide an indication of fuel quality. Next, in step 716, the routine determines whether the parameter FQ read from sensor 160 is between a lower limit (L1) and an upper (L2). When FQ is less than or equal to L1, the routine continues to step 718. When FQ is between L1 and L2, the routine continues to step 720. Finally, when FQ is greater than or equal to L2, the routine continues to step 722.

In step 718, the routine increases scheduled fuel amount by $\Delta 2$. Alternatively, in step 722, the routine decreases a scheduled fuel amount by $\Delta 1$. Finally, in step 720, no adjustment to the fuel delivered based on sensor 160 is used. From either 718, 720 or 722, the routine continues to step 724 to adjust the ignition timing based on the signal FQ. In one embodiment of step 724, the routine adjusts the location of borderline spark based on the fuel viscosity.

In this way, the routine adjusts the injected fuel amount to account for variations in the fuel quality and thereby achieve improved engine starting. Specifically, when the signal FQ indicates a high signal (for example greater than 110.202 megahertz), the routine decreases injected fuel since the sensor indicates that combustion may be too rich. Conversely, when sensor 160 indicates a low output (for example less than 110.193 megahertz) the routine increases the scheduled fuel amount since the sensor indicates that the fuel may provide combustion that is too lean.

Note that there are various alternative embodiments to the present disclosure. For example, the routine may continue the adjustment of fuel based on sensor 160 even after an engine start. For example, the adjustment can be continued for a predetermined number of seconds after an engine start, or after a predetermined number of throttle tip-in maneuvers by the driver. Also note that adjustment of the injected fuel and ignition timing based on the sensor 160 can be used for other engine operating modes than engine starting, such as, for example: during fuel vapor purging, or adaptive learning of the engine sensors 16 and 110.

Note also that in addition to adjust the fuel amount injected, the timing of the fuel injection can be adjusted based on sensor 160. For example, by changing the timing of the fuel injection, it is possible to change the amount of fuel injected and/or inducted into the engine. Furthermore, depending on the fuel quality, it may be beneficial to inject the fuel at an earlier or later time to reduce emission generation during the combustion process. This is especially true for engines utilized direct injection, where injector 68 is located to inject fuel directly into combustion chamber 30.

In an alternative embodiment, both sensor 160 and dielectric sensor 162 are utilized to determine fuel volatility (or viscosity) as indicated in FIG. 3, for example. As an example, sensor 160 provides an indication of the fuel DI (or volatility, or stoichiometric air-fuel ratio, etc.) while sensor 162 provides an indication of the ethanol content of the fuel. Then, both the indicated volatility and alcohol content can be used to determine the amount of fuel to be injected during engine starting. Further, the ignition timing can also be set based on this determination from both sensors 160 and 162. Experimental testing with different fuels and ignition timing values can provide the calibration data for such an approach.

Figure 8A:
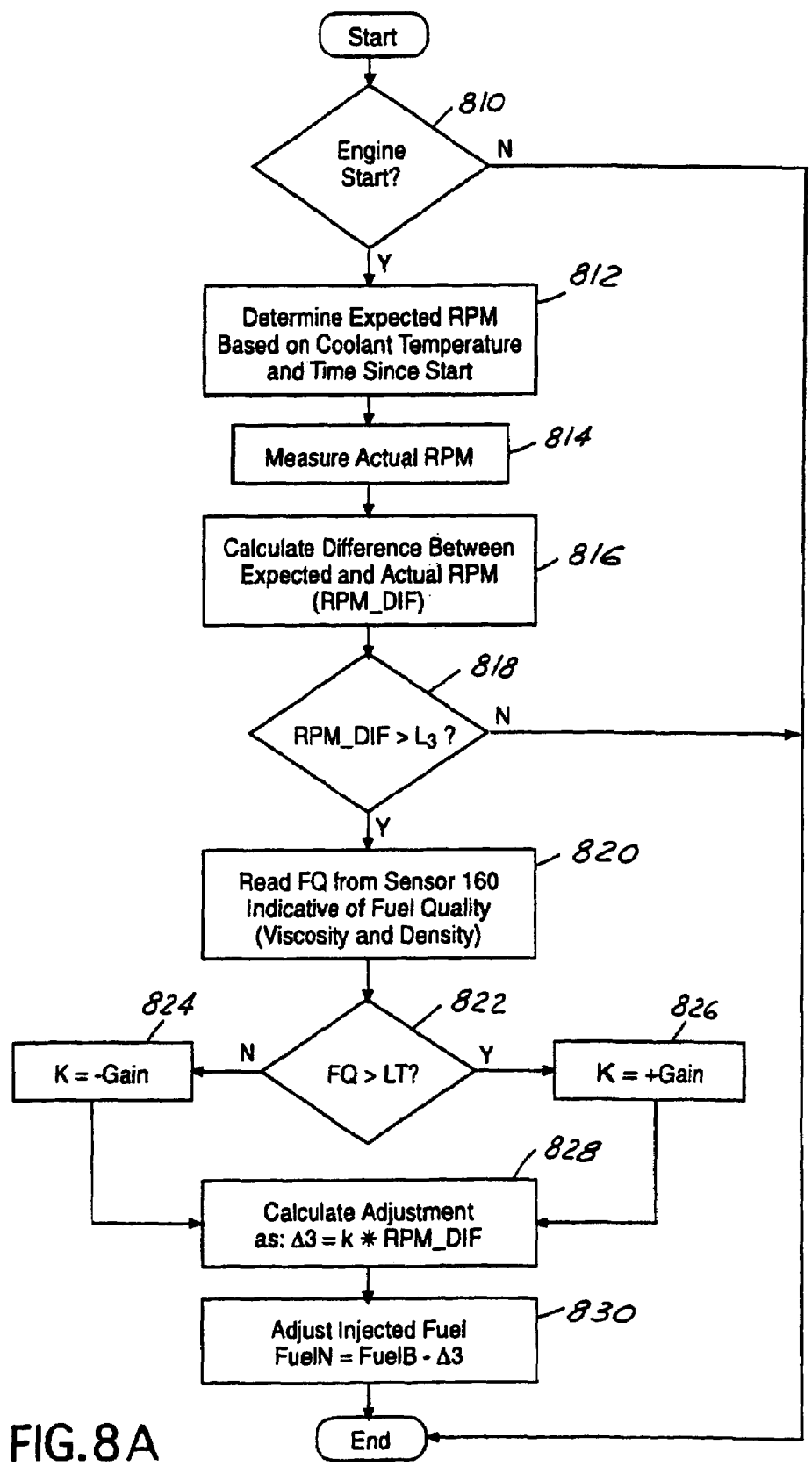
Figure 8B:
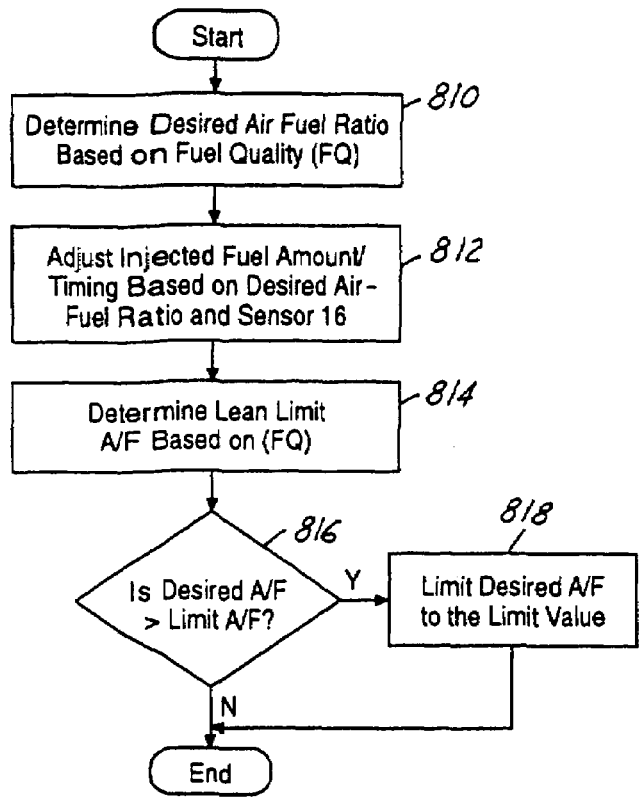

Referring now to FIG. 8, an alternative embodiment for adjusting injected fuel based on sensor 160 is described. In step 810, the routine determines whether the engine is in the starting mode. Specifically, the routine determines whether the engine has exited engine cranking. When the engine has exited engine cranking, the answer to step 810 is "yes" and the routine continues to step 812. In step 812, the routine determines an expected engine speed (RPM) based on engine coolant temperature (ECT) and times since engine starting.

Next, in step 814, the routine measures actual engine rpm based on sensor 118. Then, in step 816, the routine calculates the difference (RPM_dif) between the expected engine speed and the measured actual engine speed. Then, in step 818, the routine determines whether the engine speed difference is greater than a limit (L3). Specifically, limit L3 represents a hysteresis band allowing small changes in engine speed without control action. When the answer to step 818 is "yes", the routine continues to step 820. In step 820, the routine reads signal (FQ) from sensor 160 indicative of the fuel quality. As described above, sensor 160 can provide an indication of fuel viscosity, fuel density, the product of fuel viscosity and density, dynamic fuel viscosity times density, or static fuel viscosity times density. In this particular example, the sensor 116 provides an indication of dynamic viscosity times density.

Then, in step 822, the routine determines whether the signal of Q is greater than a limit L4. In one example, limit L4 is set to 110.199 megahertz when using the acoustic wave device described in FIG. 2. When the answer to step 822 is "no", the routine continues to step 824 and sets the control parameter (K) equal to minus GAIN. Alternatively, when the answer to step 822 is "yes", the routine sets the control parameter (K) equal to plus GAIN in step 826. Next, in step 828, the routine calculates an adjustment $\Delta 3$ based on the feedback parameter K times the rpm difference (RPM_DIF). Then, in step 830, the routine adjusts the new fuel injection amount (fueln) based on the base fuel amount minus the calculated adjustment $\Delta 3$. This value is then used to adjust the fuel injector 68 to deliver the requested fuel amount to the engine.

In still another aspect of the present disclosure, the desired air-fuel ratio can be adjusted based on the fuel quality (sensor 160 or a corresponding estimate). For example, the combustion air-fuel ratio is typically feedback controlled based on exhaust gas oxygen sensors, such as sensor 16, for example. In this case, the amount of injected fuel is adjusted to maintain the desired air-fuel ratio. Thus, according to one aspect of the present disclosure, this desired air-fuel ratio can be adjusted to compensate for changes related to changes in the fuel quality. In this way, it is possible to obtain improved combustion and reduced emissions by setting the desired air-fuel ratio closer to the actual stoichiometric ratio of the fuel. Further, the air-fuel ratio of the combustion gasses can be limited to certain air-fuel ratio ranges to prevent combustion instability. In yet another aspect of the present disclosure, this air-fuel limit (typically the lean air-fuel limit) can be adjusted based on the fuel quality, viscosity, and/or volatility. Such a system is described in FIG. 8B.

In particular, in step 810, the routine determines the desired air-fuel ratio set-point based on the fuel quality. Then in step 812, the routine controls the injected fuel quantity and/or timing to maintain the desired value based on the exhaust gas oxygen sensor 16. Then, a limit air-fuel ratio is determined in step 814 based on the fuel quality. Then, steps 816 and 818 prevent the desired value for surpassing the limit value.

Figure 9:
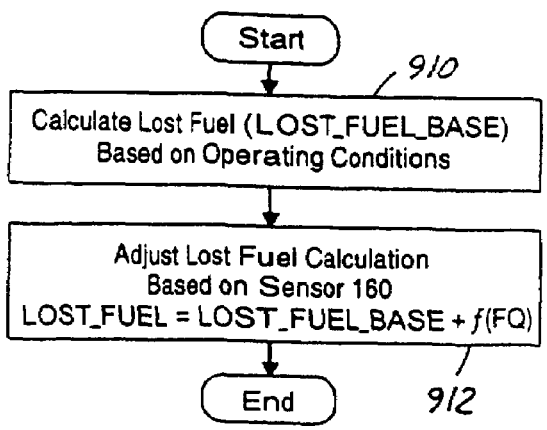

Referring now to FIG. 9, the routine is described for adjusting the lost fuel calculation based on the fuel viscosity. Lost fuel refers to the fuel—does not participate in engine combustion and past the piston rings of the engine 10. First, in step 910, the routine calculates a base lost fuel parameter based on engine operating conditions as is known in the art. Then, in step 912, the routine adjusts this lost fuel calculation based on a function of the signal FQ received from sensor 160. The lost fuel parameter (LOST_FUEL) is used to control engine fuel injection and ignition timing during engine starting and other operating conditions.

Also note that other fuel calculations can be adjusted based on the fuel quality sensor 160. In particular, transient fuel models can adjust the fuel puddle size and time constant values based on the fuel quality sensor 160.

Figure 10:
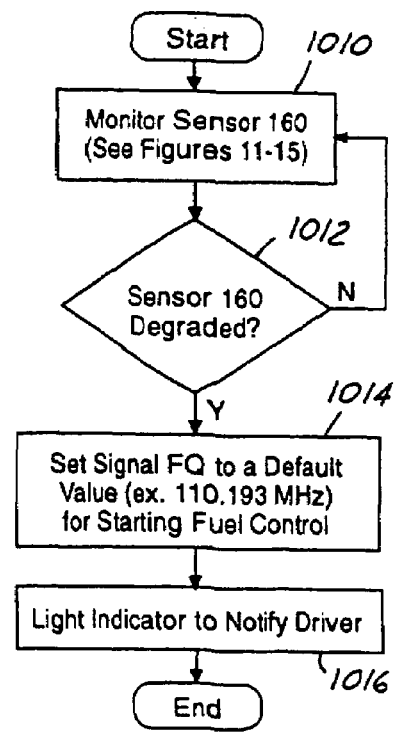

Referring now to FIG. 10, the routine is described for performing default operation in the case when sensor 160 has degraded. In this way, the engine can provide acceptable combustion even if sensor 160 is degraded. First, in step 1010 the routine monitors sensor 160 as described herein with respect to FIGS. 11 through 13. Next, in step 1012, the routine determines whether sensor 160 is degraded. When the answer to step 1012 is "no", the routine returns to step 1010.

When the answer to step 1012 is "yes", the routine continues to step 1014 and sets the signal FQ received from sensor 160 to a default value (for example 110.193 megahertz) which can then be used in the fuel starting control routines described above herein. In other words, the routine ignores the actual sensor output and replaces this actual sensor output with a predetermined default value. Further, in step 1016, the routine lights an indicator light to notify the driver of the degraded sensor.

In this way, it is possible to continue acceptable engine combustion even when the fuel quality sensor provides a degraded output. The default value selected to be used in this case represent values that are least likely to result in degraded engine combustion irrespective of the fuel quality actually in tank 140.

Figure 11:
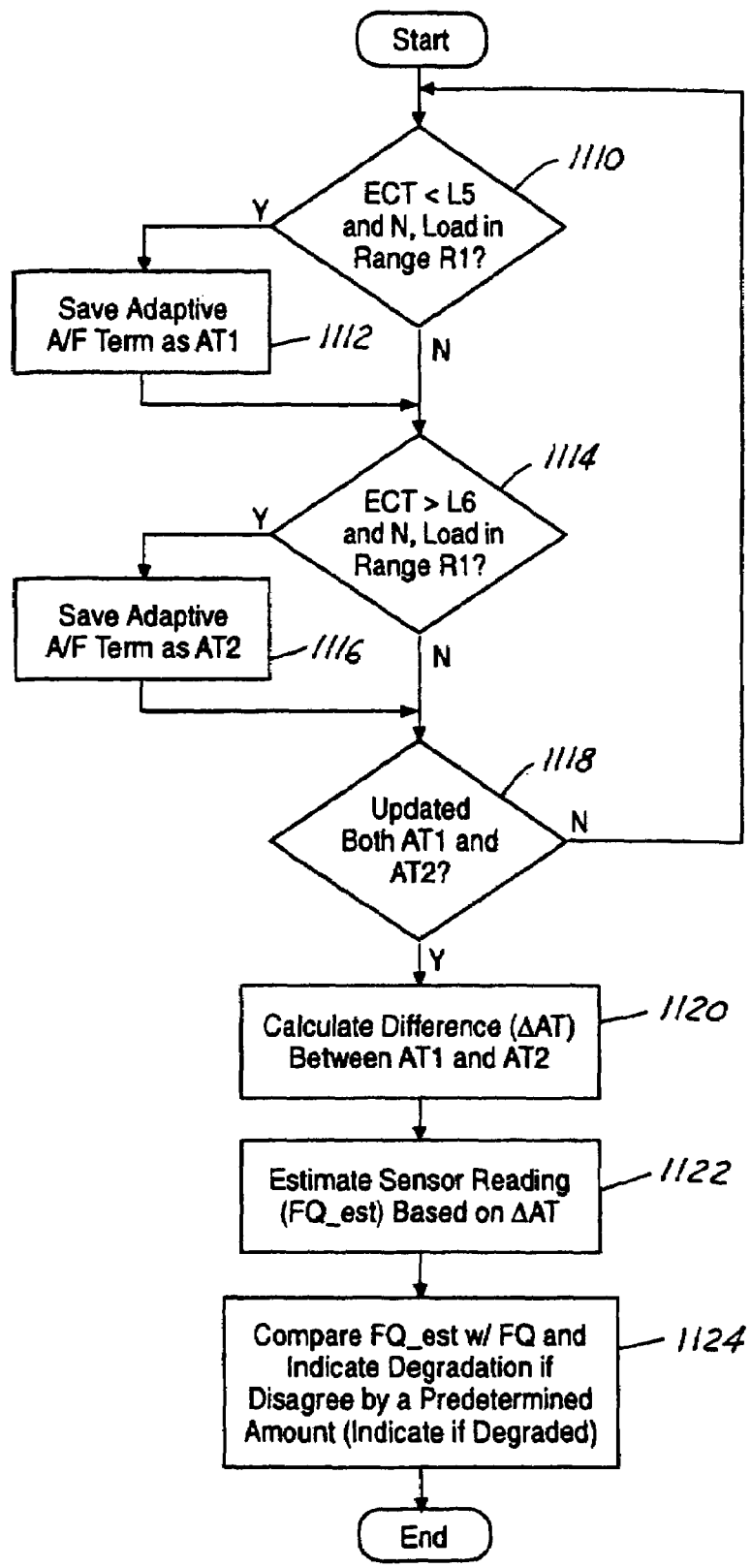

Referring now to FIG. 11, the routine is described for determining the degradation of sensor 160. In general terms, the routine uses estimates of combustion air-fuel ratio during cold and warm engine operating conditions to determine an estimated fuel quality value which is then compared to the sensor reading to determine whether the sensor has degraded.

First, in step 1110, the routine determines whether engine coolant temperature is less than a threshold (L5) and whether the engine speed and load are in a first predetermined range (R1). When the answer to step 1110 is "yes", the routine continues to step 1112 and saves the adaptive air-fuel ratio term as AT1. The adaptive air-fuel term is based on long term adaptive learning via sensor 16.

Next, in steps 1114 and 1116, this is repeated for warm engine operating conditions (ECT greater than L6) and this time the adaptive term is saved as AT2. Next, in step 1118, the routine determines whether both AT1 and AT2 have been updated via steps 1112 and steps 1116. When the answer to step 1118 is "no", the routine returns to the start. When the answer to step 1118 is "yes", the routine continues to step 1120.

Continuing with FIG. 11, in step 1120 the routine calculates the difference of ($\Delta T$) between the first and second saved adaptive terms. This represents a change in combustion air-fuel ratio between cold and warm engine coolant temperatures within a defined engine speed range R1. Next in step 1122 the routine estimates a sensor reading (FQ_EST) based on the calculated difference $\Delta AT$. Then, in step 1124, the routine compares the estimate with the sensor reading and indicates whether degradation has been detected. In particular, the routine determines whether the difference between the estimate and the actual sensor reading is greater than a predetermined amount for a predetermined duration. When this occurs, the routine provides an indication to the driver via an indicator light.

Figure 12:
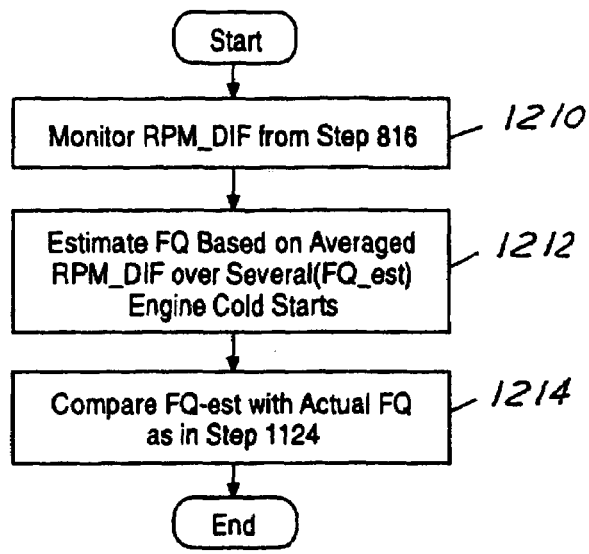

Referring now to FIG. 12, an alternate embodiment for determining degradation in sensor 160 is described. First, in step 1210 the routine monitors the rpm difference from step 816 of FIG. 8. In particular, the routine monitors the rpm difference over numerous engine starts and averages this value with a predetermined averaging filter rate. Then in step 1212, the routine estimates the sensor output (FQ) based on the average rpm difference over these monitored engine cold starts. In one example, the routine monitors between 15 to 20 engine cold starts to provide an estimate of the sensor output. Alternatively, more or less engine starts can be utilized depending on the required accuracy. Then, in step 1214, the routine compares the estimate with the actual sensor reading as described above herein with particular reference to step 1124.

Figure 13:
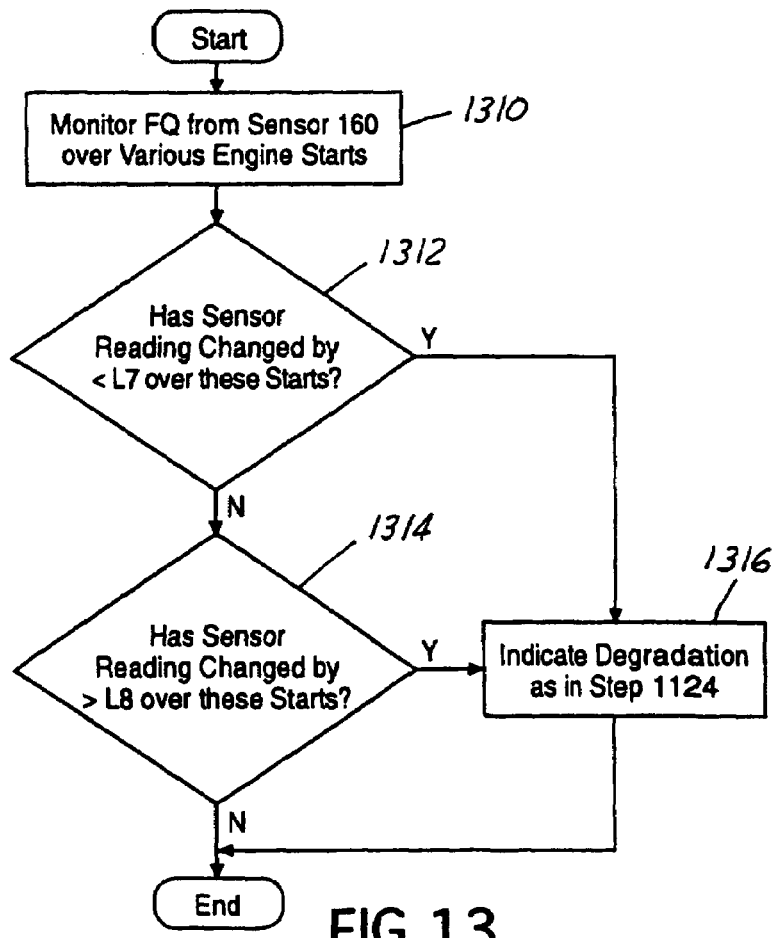

Referring now to FIG. 13, yet another alternative embodiment for determining degradation in sensor 160 is described. In particular, this routine monitors the sensor output over time and detects suspiciously constant sensor output, or suspiciously large changes in sensor output.

First, in step 1310, the routine monitors the signal sensor output (FQ) over various engine starts. Next, in step 1312, the routine determines whether the sensor reading has changed by less than a threshold (L7) over these engine starts. As above, approximately 10 to 15 engine starts can be utilized. As above, more or less engine starts can be utilized based on the required accuracy. In particular, in step 1312, the routine monitors the sensor reading over several fuel tank refills. If the sensor reading has not changed over various starts and refills, the routine determines that the sensor has degraded in step 1316 as described above herein with particular reference to 1124 indicates this to the driver via an indicator light.

When the answer to step 1312 is "no", the routine continues to step 1314. In step 1314, the routine determines whether the sensor reading has changed by greater than a predetermined amount (L8) over various engine starts. If the sensor reading changes greater than this amount, the routine indicates degradation in step 1316 as described above.

Still another alternative embodiment, that can be used alone or in addition to the above described approaches, would use a purposeful disturbance of the amount of injected fuel during idle conditions. There should be no effect if the sensor is measuring accurately. If the sensor output is degraded, then a further deviation will result in an rpm fluctuation.

Note that the estimates in FIGS. 11–14 (as well as in FIG. 17B) can be used in place of the sensor reading in an alternative embodiment.

Figure 14:
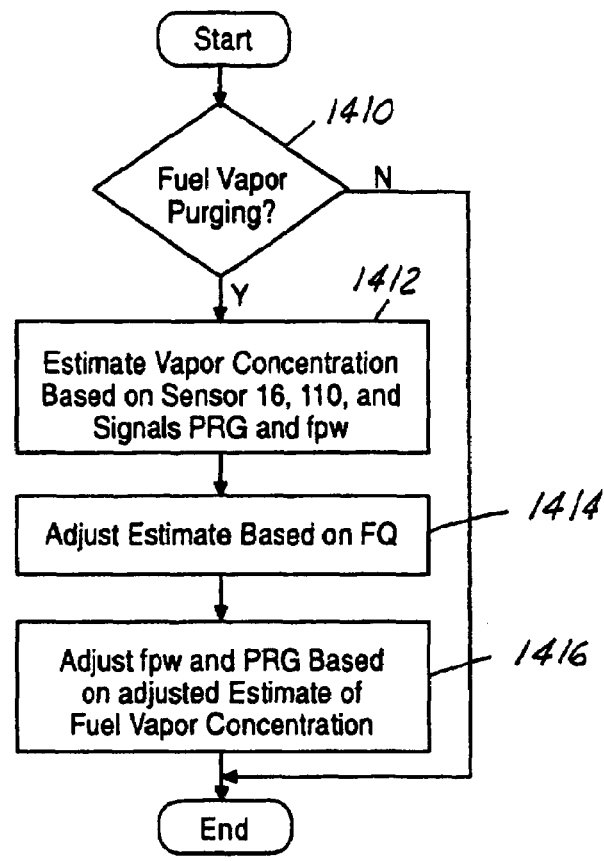

Referring now to FIG. 14, a routine is described for adjusting fuel vapor purging estimation and control based on sensor 160. First, in step 1410, the routine determines whether the engine is currently purging fuel vapors from the fuel system. When the answer to step 1410 is "Yes", the routine continues to step 1412 and estimates the vapor concentration based on various sensors, such as for example: oxygen sensor 16, mass air flow sensor 110, command signal (PRG), and command signal (FPW). Various methods are known for estimating fuel vapor concentration and can be used in step 1412.

Next, in step 1414, the routine adjusts the estimate based on the fuel quality signal FQ from sensor 160. In particular, the routine adjusts the amount of fuel vapors estimated by shifting the assumed stoichiometric combustion air-fuel ratio to account for the output from sensor 160. In this way, the routine can re-calculate the fuel vapor quantity using this additional information. Then, in step 1416, the routine can adjust the fuel pulse with and purge control valve based on this adjusted estimate of fuel vapor concentration to more accurately control engine combustion.

In addition, an estimate of the fuel vapor concentration coming from the tank (before feedback information becomes available) can be determined based on the fuel quality.

Figure 15:
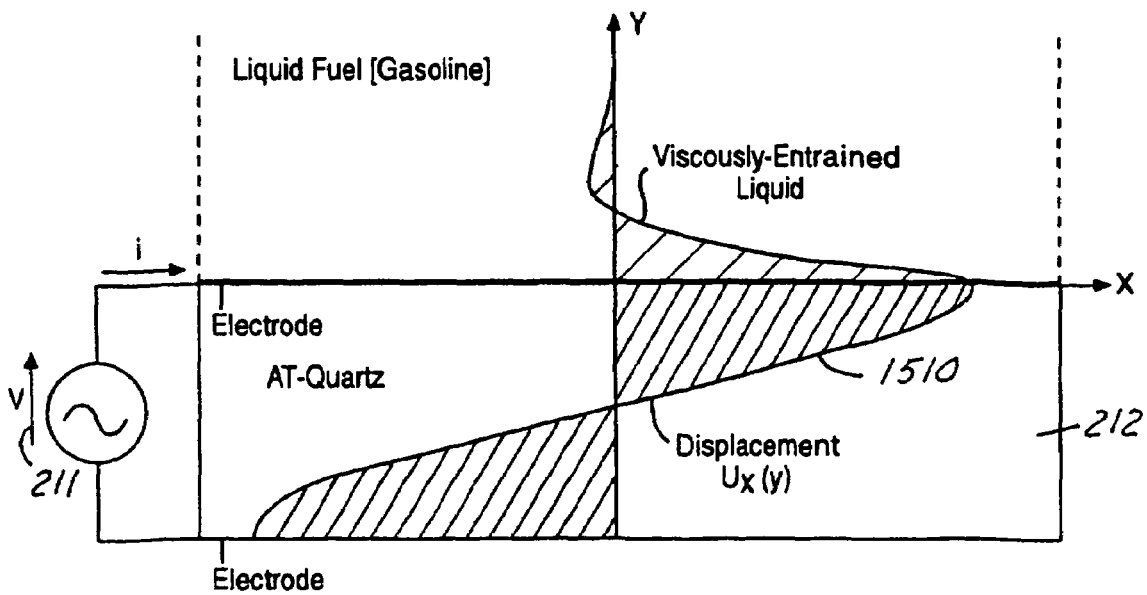
FIG. 15 is a graph illustrating transmission of the acoustic wave.

FIG. 15 shows in detail how the liquid fuel interacts with the acoustic wave, the amplitude of which is shown as 1510. This illustrates how the wave generated by the oscillator circuit propagates into the liquid, thereby creating the basic sensing ability of the device. This interaction is influenced by the liquid density and viscosity.

Figure 16:
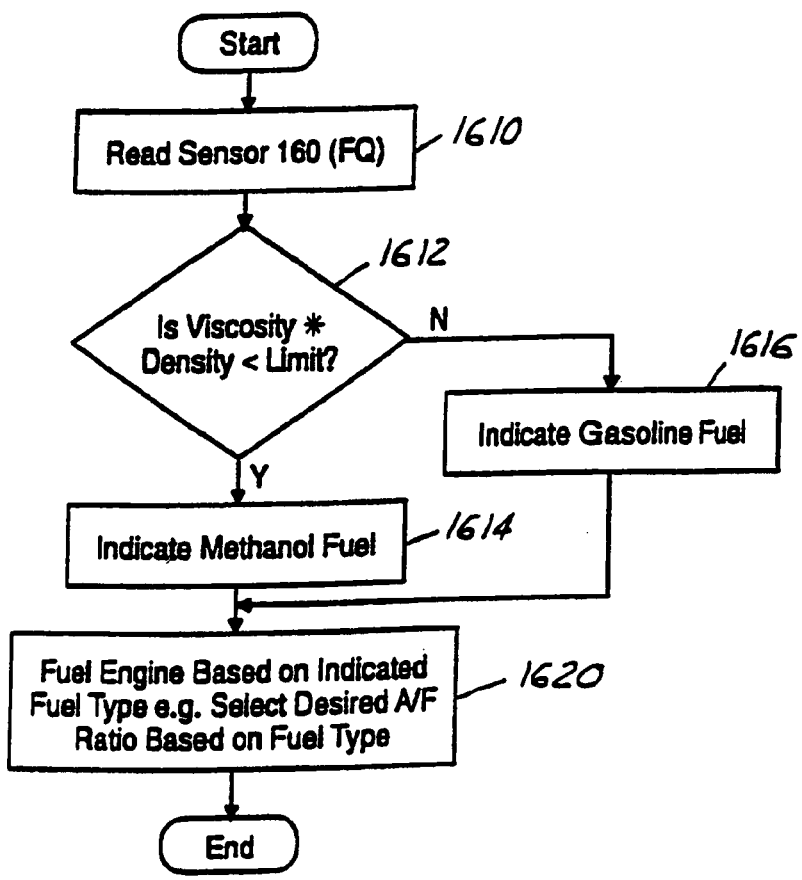

FIG. 16 shows a routine for adjusting the engine fuel control depending on whether the fuel used is methanol (M85), or gasoline fuel. As shown in FIG. 4, sensor 160 can be used (alone or in conjunction with sensor 162) to indicate such fuel type information. First, in step 1610, the routine measures the sensor output (FQ). Then, in step 1612, the signal (FQ, or viscosity*density depending on the type of sensor used) is compared with a value (Limit, 110.16 MHz in this example). When the answer to step 1614 is YES (i.e., FQ is less than the Limit), the routine indicates methanol fuel in step 1614. Alternatively, in step 1616, the routine indicates gasoline fuel. Then, in step 1620, the routine controls the injected fuel based on the indicated fuel type. Furthermore, the routine can adjust the ignition timing based on the fuel type, if desired.

Figure 17A:
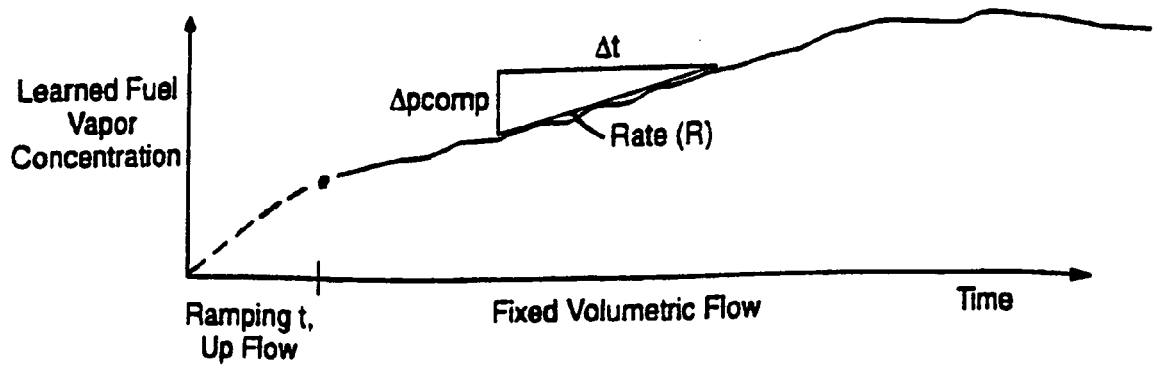
FIG. 17A is a graph showing operation according to one embodiment.
Figure 17B:
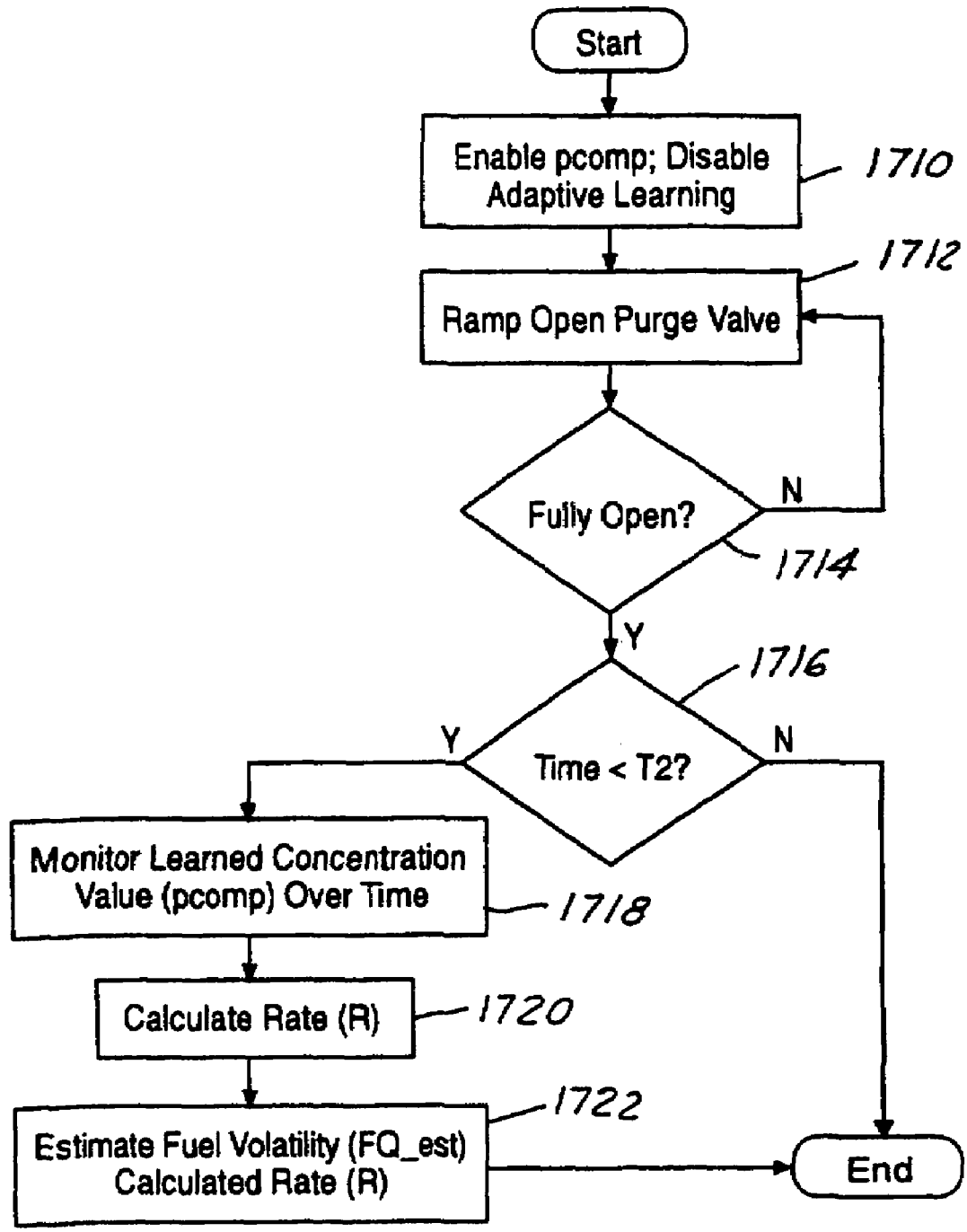
FIG. 17B is a high level flow chart for learning fuel quality.

Referring now to FIGS. 17A and 17B, yet another embodiment of a method for estimating fuel quality is illustrated. In particular, FIG. 17B shows a method utilized fuel vapor learning to estimate fuel volatility. In FIG. 17B, the routine first enables purge compensation and disables adaptive learning in step 1710. In other words, the routine assigns all of the air-fuel error to determining the concentration of fuel vapors (pcomp) in the purge flow. Typically, pcomp is the learned concentration based on the MAF sensor, fpw, and exhaust gas oxygen sensors, as is known in the art.

Next, in step 1712, the routine ramps open the purge valve. Step 1714 continues the ramping until the valve is fully open. When fully open, the routine continues to step 1716 to determine whether a timer (time) has run (i.e., reached limit time T2). If not, the routine continues to step 1718 to monitor the learned concentration value (pcomp) over this initial time period. In particular, in step 1720, the routine calculates the rate of change (R) of the purge concentration and estimates (in step 1722) the fuel quality/volatility (FQ_est) based on the calculated rate (R).

As shown in FIG. 17A, this calculated rate is taken during a fixed volumetric flow since the purge valve is fully open at time t1. This rate may provide an indication of fuel desorption or vaporization from the fuel tank and therefore can be correlated to volatility. However, in an alternative embodiment, the rate of change can be normalized with mass airflow to reduce changes in mass airflow from altering the pcomp rate of change or slope. Otherwise, the slope may be influenced by mass airflow changes. Note also that the rate of change may be correlated to a range of fuel volatility, such as for example, it may be broken down into an indication of high volatility, medium volatility, or low volatility.

As such, the learning based on the liquid injected fuel is disabled and the learning of the fuel quality based on vaporized fuel is enabled.

Also note that the learning of the fuel quality can be enabled after a second period (after the valve is fully open) to eliminate degraded reading from the stored vapors in the tank. By enabling learning of the fuel quality based on the rate of change after the stored vapors have been purged, a better reading of the fuel vaporization rate can be found.

In still another embodiment, the learning of the fuel quality (or blend) can be enabled after a purge canister is blocked (or partially blocked) from providing fuel vapors to the intake manifold (e.g., via a solenoid valve). This may be used in a configuration such as when third canister 147 and valve 149 are present. In this way, airflow through the canister is reduced (or stopped) during the determination of fuel quality or blend in the generated tank vapors, so that effects of desorbed fuel vapors from the canister may be reduced.

As described above, the present disclosure uses a determination of fuel volatility (viscosity in one example) to predict the combustion characteristics of the fuel during cold engine starting. This prediction can include compensation for various parameters, such as fuel temperature, engine temperature, barometric pressure, atmospheric temperature, intake air temperature, and others. In any event, the engine controller is able to adjust the amount of scheduled fuel (or scheduled air-fuel mass ratio) based on the sensed data. This allows for a tighter control of combustion air and fuel (thereby improving engine emissions even for "normal" fuels). In addition, it allows for improved engine startability and driveability, even when so called "fringe" fuels, such as high or low DI fuels are experienced in the engine. In this way, a feedfoward estimate of the fuel quality can be obtained without waiting for dips in engine speed.

A fuel vapor volatility indication may also indicate fuel blend. For example, ethanol, or an ethanol gasoline mixture, may have higher volatility than gasoline. This may then be used in multi-fuel vehicles to indicate fuel blend, and then used to control the engine, or be used in diagnostics. There are likely many other uses for a fuel vapor volatility indication (measured or estimated). For example, evaporation of the manifold fuel puddle may be influenced by fuel vapor volatility. Therefore, a fuel vapor volatility indication may be used to determine rate of evaporation in a transient fuel algorithm, and thus used to adjust fuel injection during transient fuel operation.

Further, with a combination of a viscosity-density sensor and a dielectric sensor, one can measure both the DI and amount of ethanol present in the fuel.

In yet another aspect of the present disclosure, the method uses a viscosity-density sensor to measure large concentrations of alcohol as can be present in flex fuels (0–85% ethanol).

Note that various embodiments have been described for determining fuel quality, volatility, and/or viscosity. In one example, an acoustic wave sensor uses acoustic energy to determine fuel viscosity, which is then used to determine fuel combustion quality. In another embodiment, the fuel quality is estimated from adaptive parameters based on exhaust gas air-fuel ratio sensors. In still another embodiment, the rate of change of exhaust gas sensors is utilized to estimate fuel volatility, and thereby estimate fuel quality.

Another advantageous use of fuel volatility relates to fuel tank leak detection and diagnostics. Specifically, in one example, a measurement or estimate of fuel volatility can be used in determining leaks in the fuel system, such as the fuel tank or fuel rail, for example. In one embodiment, where pressure is monitored in a sealed fuel system after the engine is stopped, a fuel volatility determination can be used to enable, disable, or modify a leak detection test. The fuel system can be sealed by closing vent valves, such as the optional valves included in canisters 144 and 146, as well as valve 149. In one example, after the engine is stopped (off) and the system is sealed, pressure (and optionally temperature) in the fuel system can be expected to change (increase) due to heat transfer into the tank (from the environment and/or vehicle), or For example, a volatility indication may be used during on-board diagnostics to abort or prevent fuel system diagnostics when fuel vapor volatility is high. Otherwise, the high pressure caused by high fuel vapor volatility may mask detecting fuel vapor leakage.

This concludes the detailed description.

We claim:

1. A method of determining degradation of a fuel system including a fuel tank of a vehicle having an engine, the method comprising:
   purging fuel vapors generated in the tank in the engine;
   determining an indication of fuel volatility during said purging operation; and
   enabling detection of degradation of the fuel system after the engine is stopped based on said indication.

2. The method of claim 1 wherein said purging is performed during engine operation.

3. The method of claim 1 further comprising, during purging, adjusting a fuel injection amount based on feedback from an exhaust gas oxygen sensor in an engine exhaust to obtain a desired air-fuel ratio.

4. The method of claim 3 wherein said indication is based on said feedback.

5. The method of claim 1 wherein said indication is based on a rate of change of estimate fuel vapors.

6. The method of claim 1 wherein said indication is adjusted based on mass air flow.

7. The method of claim 1 wherein said indication is affected by a purge valve position.

8. The method of claim 1 wherein degradation detects a leak in said fuel system based on changes in pressure in said fuel system after the engine is stopped.

9. The method of claim 8 wherein said degradation further includes closing a valve in said fuel system.

10. A method of determining degradation of a fuel system including a fuel tank of a vehicle having an engine, the method comprising:
    purging fuel vapors generated in the tank in the engine;
    determining an indication of fuel volatility during said purging operation that is affected by a rate of change of fuel vapor during said purging; and
    adjusting engine operation based on said indication, wherein said adjusting engine operation includes enabling detection of degradation of the fuel system after the engine is stopped.

11. The method of claim 10 wherein said adjusting engine operation includes adjusting a fuel injection amount during engine starting.

12. A method of determining degradation of a fuel system including a fuel tank of a vehicle having an engine, the method comprising:
    purging fuel vapors generated in the tank in the engine when fuel vapor entering the engine from a fuel system canister are below a threshold;
    determining an indication of fuel volatility during said purging operation; and
    enabling detection of degradation of the fuel system after the engine is stopped based on said indication.

13. A system for a mobile vehicle having an engine, comprising
    a fuel tank;
    a fuel system valve coupled to the fuel tank, said valve coupled between an environment of the vehicle and said tank;
    a fuel system canister coupled in the system;
    an exhaust gas sensor coupled in an engine exhaust; and
    a controller for purging fuel vapors generated in the tank in the engine while the engine is performing combustion, determining an indication of fuel volatility based on said purging operation; and enabling detection of degradation of the fuel system after the engine is stopped based on said indication.

14. The system of claim 13, wherein during said determining, said fuel system canister is blocked from the engine.

* * * * *